(12) United States Patent
Al-Khalil

(10) Patent No.: US 7,708,227 B2
(45) Date of Patent: May 4, 2010

(54) ENERGY-EFFICIENT ELECTRO-THERMAL ICE-PROTECTION SYSTEM

(75) Inventor: Kamel Al-Khalil, Kinnelon, NJ (US)

(73) Assignee: Cox & Company, Inc., Plainview, NY (US)

( * ) Notice: Subject to any disclaimer, the term of this patent is extended or adjusted under 35 U.S.C. 154(b) by 408 days.

(21) Appl. No.: 11/327,262

(22) Filed: Jan. 6, 2006

(65) Prior Publication Data

US 2007/0170312 A1   Jul. 26, 2007

(51) Int. Cl.
*B64D 15/12*   (2006.01)

(52) U.S. Cl. .............................. 244/134 D; 244/134 R; 244/134 A

(58) Field of Classification Search ............. 244/134 R, 244/134 A, 134 D, 134 B, 134 C
See application file for complete search history.

(56) References Cited

U.S. PATENT DOCUMENTS

| | | | |
|---|---|---|---|
| 2,214,919 A * | 9/1940 | Burgess | .................. 244/134 A |
| 2,393,635 A | 1/1946 | Hubbard | |
| 2,407,528 A | 9/1946 | Antonson | |
| 2,418,205 A | 4/1947 | Taylor | |
| 5,558,304 A * | 9/1996 | Adams | ................... 244/134 A |
| 5,657,951 A | 8/1997 | Giamati | |
| 5,686,003 A * | 11/1997 | Ingram et al. | ............... 219/201 |
| 5,782,435 A | 7/1998 | Ingram et al. | |
| 5,904,322 A * | 5/1999 | Giamati et al. | ........... 244/134 B |
| 5,921,502 A * | 7/1999 | Al-Khalil et al. | ........ 244/134 R |
| 6,196,500 B1 * | 3/2001 | Al-Khalil et al. | ........ 244/134 R |
| 6,283,411 B1 * | 9/2001 | Giamati et al. | .......... 244/134 A |

OTHER PUBLICATIONS

Oct. 5, 2007 International Search Report issued by the European Patent Office as ISA in PCT/US2006/020886 (counterpart to this patent application).
Oct. 5, 2007 Written Opinion of the International Searching Authority in PCT/US2006/020886 (counterpart to this patent application).

* cited by examiner

*Primary Examiner*—Timothy D Collins
*Assistant Examiner*—Philip J Bonzell
(74) *Attorney, Agent, or Firm*—Mark H. Jay

(57) ABSTRACT

A region of an airfoil to be protected from accreted ice is heated to reduce the strength of the bond between the ice and the airfoil, and is mechanically deformed to shed the accreted ice after the bond has been sufficiently weakened. Heating ceases before substantial water runback is generated. The mechanical deformation and the cessation of heating occur approximately simultaneously.

6 Claims, 6 Drawing Sheets

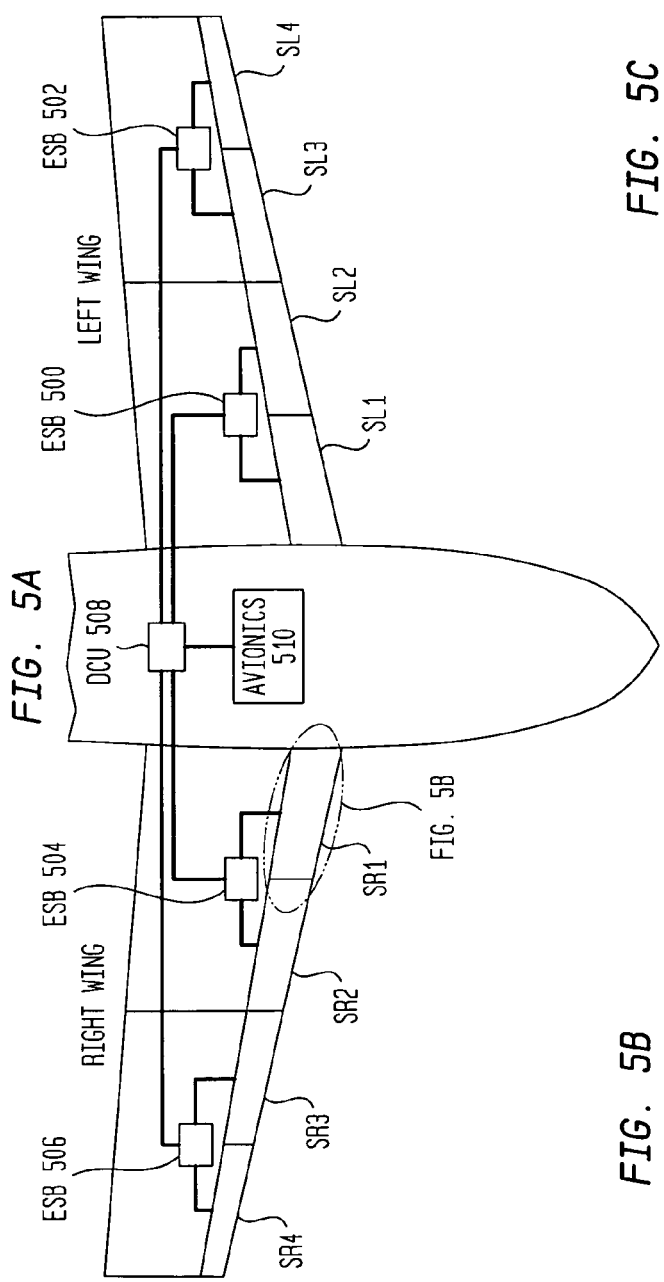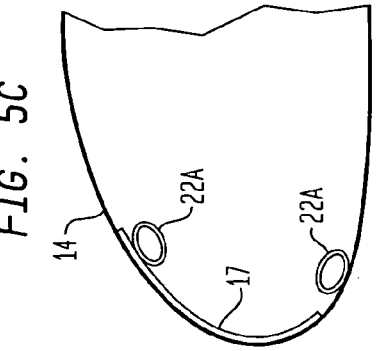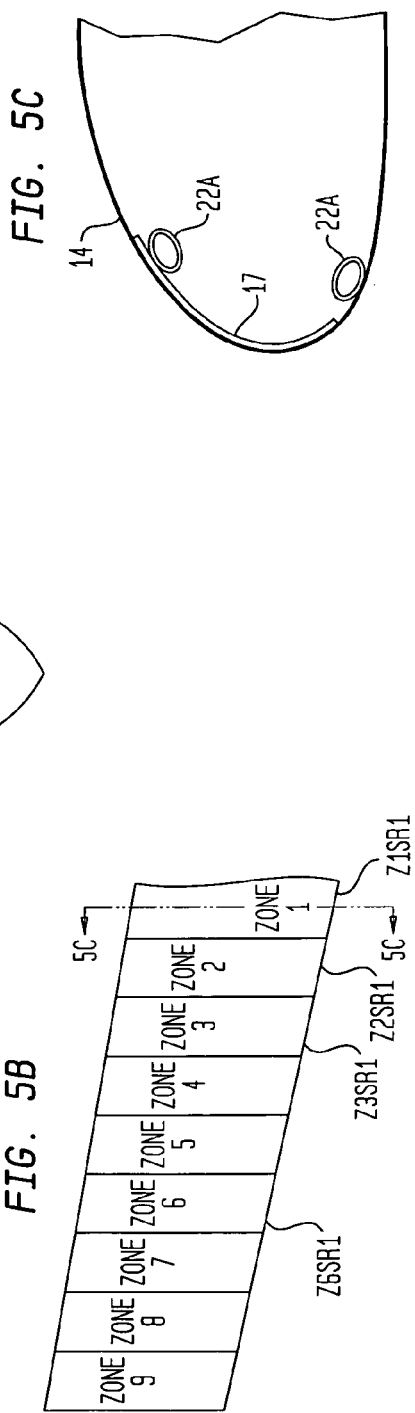

ENERGY-EFFICIENT ELECTRO-THERMAL ICE-PROTECTION SYSTEM

BACKGROUND OF THE INVENTION

The invention relates to ice protection, and more particularly relates to ice protection systems for use on aircraft. In its most immediate sense, the invention relates to aircraft ice protection systems of the type in which a semi-rigid skin forms a lifting surface of the wing and in which ice is removed by flexing the skin.

Ice contamination of lifting surfaces (e.g. wings and horizontal tails) is always disadvantageous because it interferes with airflow over the surface. This in turn increases drag, reduces lift, and reduces the angle of attack at which the airfoil enters a stall. For this reason, airplanes are provided with systems that protect lifting surfaces from excessive levels of ice contamination on critical regions of the lifting surface.

Ice protection systems vary widely in performance. This is because different types of aircraft lifting surfaces have different sensitivities to ice contamination and, consequently, different ice protection requirements. For example, certain lifting surfaces may use airfoils that are more or less tolerant to the effects of ice contamination than are other airfoils; a quantity of accreted ice that might only imperceptibly degrade the performance of one type of airfoil section might be a severe hazard to another type of airfoil when operated at similar or different flight conditions.

Accordingly, different types of ice protection systems are optimized differently; energy available for ice protection is selectively applied to address the particular sensitivity of one airfoil section as opposed to another. On some airplanes, there may be sufficient electrical power to operate an ice protection system that relies on electrically-generated heat (e.g., an electro-thermal deicing or anti-icing system) while on others, the available electrical power is insufficient for such a system. Such considerations necessarily affect the selection of the type of ice protection system to be used. For example, on an airplane having ample electrical power or bleed air, an energy intensive evaporative anti-icing system may be employed, while for a power-limited application a deicing system may be used to shed ice only when the ice accumulation reaches a predetermined distributed thickness that has been shown to degrade the performance of the airfoil to an unacceptable extent.

Although many different types of ice protection systems are available to address a wide variety of applications for ice protection, one application category is particularly problematic. This is when the airfoil is very sensitive to ice contamination and there is limited power available for operation of an ice protection system that meets the required performance.

The present invention is suitable for applications of this type. Tests have demonstrated that a preferred embodiment of this invention can maintain worst-case distributed ice accretions to within critical limitations (typically less than 0.050 inch) while consuming only a fraction of the power that would conventionally be expected to be required for such an application.

The invention proceeds from a realization that an existing ice protection system can be reconfigured to operate in an entirely different and highly advantageous manner. Commonly-owned U.S. Pat. No. 5,921,502 (incorporated herein by reference, and referred to hereinafter as the "'502 patent") discloses a hybrid ice protection system in which an airfoil has a semi-rigid skin 58. The skin 58 is caused to flex by actuators 50, 52, 54, and 56, and the leading edge region 4' is heated by an electrical heater 10'. In operation, the electrical heater 10' is operated as a running-wet anti-icer and ice accreted aft of the leading edge region 4'—so-called "runback refreeze" ice—is periodically removed by the actuators 50, 52, 54, and 56. In essence, the '502 patent discloses an ice protection system that uses heat to prevent ice contamination where the airfoil is most roughness-sensitive and uses mechanical flexing of a semi-rigid skin to shed accreted ice from locations where the airfoil is less so.

The inventor of the present invention realized that energy efficiency of such a hybrid system would be much improved if the heat and the flexing of the semi-rigid skin were employed together in a coordinated fashion instead being used independently in different locations. In accordance with the invention, heat and mechanical deformation are both applied to a region to be protected, but the heat is used only to increase the temperature of the ice/skin interface, reducing the adhesion force between the ice layer and the subjacent skin and thereby weakening the bond between the skin and the ice that has accreted upon it instead of removing the ice by melting it into water (as in the prior art). Once this bond has been weakened, two things happen approximately simultaneously: the heat is turned off, and the actuators are fired to flex the skin. Because the bond between the ice and the skin has been substantially reduced or eliminated, the flexing of the semi-rigid skin completely sheds the accreted ice. Furthermore, the absence of heating between deicing cycles causes the temperature of the skin to drop below freezing before runback refreeze can be created. Consequently, much less overall heat is delivered to the protected region, and this greatly improves the energy efficiency of the system.

Advantageously although not necessarily, and in the preferred embodiment, energy consumption of the system is further reduced by removing accreted ice from the airfoil on a zone-by-zone basis. This is accomplished by dividing the airfoil into a series of zones that extend along the span of the airfoil and then applying heat to individual zones sequentially, one at a time. This avoids the power drain that would be required to heat the entire airfoil at once. In particular, it is possible to eliminate the continuously heated parting strip along the entire span of a typical electro-thermal de-icing system.

In the preferred embodiment, heating continues until a very thin layer of ice at the ice/skin interface is melted immediately adjacent the skin. This insures that the accreted ice is completely shed when the skin is deformed. However, this is only preferred, and it may be possible to obtain acceptable performance even if the ice is not entirely melted at the surface of the skin.

In the preferred embodiment, the heating and flexing are co-located in the region of the airfoil that is most sensitive to the effects of accreted ice. This applies the maximum heat and the maximum mechanical force to the accreted ice in the location where ice will most seriously degrade aerodynamic performance. However, it will be understood that even if the ice to be removed is at some distance from the heater, the actuators, or both, it is nonetheless possible that the ice can be removed. Furthermore, in accordance with the preferred embodiment, regions of the airfoil that are less sensitive to ice contamination are protected only by flexing of the skin, as in the '502 patent.

In the preferred embodiment, heating is electro-thermal. However, this is only preferred, and it may be possible to obtain acceptable performance using bleed air as a source of heat.

BRIEF DESCRIPTION OF THE DRAWINGS

The invention will be better understood with reference to the following illustrative and non-limiting drawings, in which:

FIGS. 4, 5A, 5B, and 5C schematically illustrate deicing of the wings of an aircraft in accordance with a preferred embodiment of the invention.

DETAILED DESCRIPTION OF PREFERRED EMBODIMENTS

Figure 1:
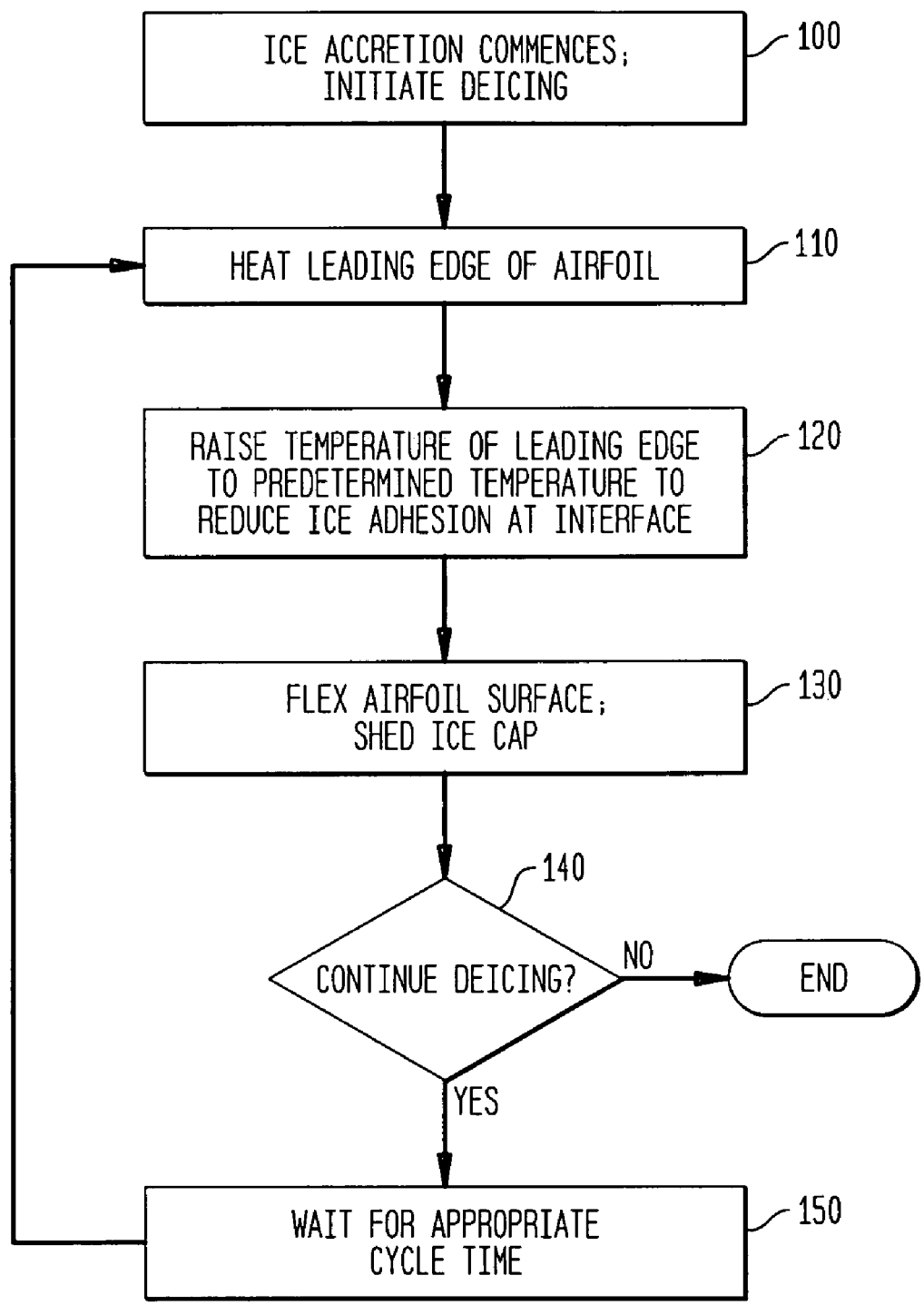
FIG. 1 is a flowchart schematically illustrating a method in accordance with a preferred embodiment of the invention.

The same element is always indicated by the same reference numeral in all views. The drawings are not necessarily to scale, and parts may be enlarged for clarity.

In the following description, the ice-protected component is specifically illustrated to be an aircraft wing. This is because the present invention was designed for this application. However, the invention is not limited to use on aircraft wings and can be used on other surfaces such as horizontal stabilizers, vertical fins, aircraft inlets, and other airfoils.

The following description also assumes that icing wind tunnel tests have been or will be carried out on a model that simulates, under designed-for conditions of flight, the accretion of ice on the component to be protected. Such tests are routinely conducted during the design of an aeronautical ice-protection system, because empirical data is necessary to verify that the system performs as required within the entire performance envelope of the aircraft. Such tests will reveal anomalies (e.g. locations on the airfoil where the heat required to weaken the bond between the skin and the accreted ice is either greater than or less than expected) and such anomalies will be corrected by appropriate decreases or increases in heat delivered to such locations. Thus, the following description necessarily describes the preferred embodiment of the invention in general terms; it is not possible to set out specific design details on an a priori basis.

I. Method in Accordance with a Preferred Embodiment

A. Theory of Operation

In accordance with the preferred embodiment of the invention, deicing is accomplished using a unique combination of heat and flexing of the ice-bearing surface. As is specifically discussed in the '502 patent, use of both heat and flexure in ice-protection systems of the semi-rigid skin type is already known.

However, in accordance with the preferred embodiment, heat and flexing are used in a specific manner that will be described in connection with FIG. 1. It will be understood that FIG. 1 relates to a single location on the leading edge of an airfoil; this is to illustrate the principle of deicing that is implemented in the preferred embodiment of the invention. The deicing of the airfoil as a whole, and the mechanism by which this is accomplished, are discussed afterward.

In accordance with the preferred embodiment, heat and flexing of the skin are applied to the same region of the airfoil and not (as is disclosed in the '502 patent) to different regions. In an initial step 100, ice has begun to accrete, and deicing is initiated. This may be done at the command of the pilot or other crew member, or alternatively automatically by using an ice sensor. Upon initiation of deicing, the protected region is heated in step 110 by energizing an electrical heater located there. (An electrical heater is preferred because it is easy to control. But, it may alternatively be possible to use another heat source such as bleed air.) As is known to persons skilled in the art, when ice accretes on a surface and the temperature of the ice-surface interface increases from cold towards 32° F., the adhesion force between the ice and the surface decreases substantially. Thus, as the electrical heater continues to operate and the temperature of the interface increases, the accreted ice becomes easier to dislodge.

Heating continues until step 120, when the temperature of the protected region has been raised to a predetermined value at which the adhesion force has been sufficiently reduced to permit adequate performance. (In tests, the assignee used a temperature of 42° F., but in practice the temperature will vary with the location of the region to be deiced. The assignee believes this temperature can be as high as 52° F. or as low as 37° F., depending on the particular application. In practice, locations on the airfoil would be mapped to calculated temperatures and icing wind tunnel tests carried out to identify locations in which the calculated temperatures were either excessive or insufficient.) In accordance with the preferred embodiment of the invention, at approximately this time the heat is turned off and then the ice-bearing surface is flexed (step 130). Flexure of the ice-bearing surface sheds the cap of accreted ice because the increase in the interface temperature has reduced the strength of the bond between the ice cap and the surface.

Optionally, heater energization may continue for a short time (e.g. two seconds) after the ice-bearing surface is flexed. This may be advantageous at very cold ambient temperatures, to insure that the melted ice remains debonded and does not refreeze while the accreted ice cap is being removed by aerodynamic forces. Alternatively, at relatively warm ambient temperatures the ice-bearing surface may be flexed shortly (e.g., two seconds) after the heater has been turned off, because at such temperatures the ice at the interface with the skin does not refreeze immediately. However, while there are conditions that may make it advantageous for the heater to be turned off slightly before or slightly after the ice-bearing surface is flexed, it is important that such flexure neither substantially precede, nor substantially follow, de-energization of the heater. If flexure comes too soon or too late, the ice may not be fully removed, and there may be places where accumulated ice exceeds the allowable ice accretion limit.

After the ice-bearing surface has been flexed, in step 140 the decision is made whether to continue deicing. As in step 100, this decision can be made automatically or by a crew member. If deicing is to be discontinued, the deicing system is shut off. If deicing is to be continued, then in step 150 the system waits until a determined state of ice accretion exists on the airfoil or for an appropriate cycle time and the cycle repeats once again with step 110.

B. Preferred Control Methodology

Step 120 can be carried out in at least two ways. It is possible to put a temperature sensor at the protected region and to use the actual temperature as a trigger to turn the heat off. Alternatively, it is possible to avoid the complexity of a temperature sensor and associated control circuitry by calculating the duration of heating in advance and turning the heat off after the heater has been turned on for the appropriate duration. As stated above, this duration will typically be obtained from actual experimental data acquired during development tests in icing wind tunnels. It is specific to the surface geometry of the airfoil, true airspeed (TAS), and outside air temperature (OAT).

The appropriate duration of heating may be approximated by monitoring the TAS of the aircraft and OAT, and applying semi-empirical equations using these variables in the calculation. Persons skilled in the art know that the maximum quantity of liquid water content (LWC) in the air is a function of the OAT (the Federal Aviation Regulations, or FARs, establish design criteria that must be met in this respect). Such persons also know that the rate at which water-bearing air is incident on the airfoil's impingement zone is a function of the aircraft's TAS.

The worst-case rate of ice accretion at any particular TAS and OAT can therefore be computed, and from this it is possible to compute the quantity of energy required to raise the protected region to a predetermined temperature at which the adhesion between the ice and the ice-accreting surface has been sufficiently reduced. Furthermore, the thermal power density produced by the heater is also known. (In experiments, the assignee used a heater that delivered power densities varying from about 20 watts/in$^2$ to about 30 watts/in$^2$ along the chord of the airfoil at a tunnel test speed of 160 knots.) From the quantity of heat required at any particular combination of OAT and TAS and the rate at which heat is delivered per unit time, it is possible to compute the duration of heating required to transfer the necessary quantity of energy for the worst case of ice accretion. The assignee has done this using a transient thermal computational model that simulates the aircraft heated skin with all the appropriate construction materials.

The assignee has verified the results from this model in an icing wind tunnel, and calculated the durations in the table below for a TAS of 250 knots (a common cruise/hold design speed). Assuming that the maximum acceptable ice accretion is 0.050 inch, and a maximum ice collection efficiency of near 30%, the model produces the following results:

| OAT (° F.) | Total Temperature @250 kts | Liquid Water Content (g/m$^3$) | Cycle Time (seconds) | Heater On Time (seconds) |
|---|---|---|---|---|
| 17.2 | 32.0 | 0.47 | Near 30 | 1 |
| 14 | 28.8 | 0.43 | 33 | 1.4 |
| −4 | 10.8 | 0.21 | 66 | 3.2 |
| −22 | −7.2 | 0.14 | 90 | 5.0 |

(The −22° F. lower limit of the above table was chosen to accord with the icing envelope defined in FAR 25, Appendix C. The total temperature column includes the effects of aerodynamic heating. At an OAT of 17.2° F., the actual temperature of accreted ice will be 32.0° F., so only a small quantity of heat will be required to melt the ice to water.) In all instances, the computed cycle time is about half the duration required for ice to accumulate to the maximum acceptable level. This provides an additional margin of safety, and is not necessary.

In other words, at a TAS of 250 knots and an OAT of 17.2° F., the heater will be energized for 1.0 second, and during this time the temperature at the interface between the accreted ice cap and the skin will rise resulting in an appropriately low adhesion strength. And, at or about the time the heater is de-energized, the protected region is flexed, causing the ice cap to be shed. The heater remains de-energized for the remainder (approximately 29 seconds) of the cycle time, after which the heater is energized once more and the cycle begins again.

At a TAS of 250 knots and an OAT of −22° F., the heater will be energized for 5.0 seconds, during which time the adhesive bond between the accreted ice cap and the skin will be appropriately degraded. The heater must remain on for a longer time than in the previous example because the temperature of the accreted ice in this example must be raised by 49.2° F. to reach the set point temperature of 42° F. (in the prior example, the temperature of the accreted ice had to be raised by approximately 10° F. to reach the 42° F. set point temperature). As in the prior example, at or about the time the heater is de-energized, the protected region is flexed, causing the ice cap to be shed. However, in this instance the heater remains de-energized for a period of 85 seconds (90 seconds cycle time less 5 seconds heating time), instead of 29 seconds as in the previous example. The reason cycle time is longer for an OAT of −22° F. than for OAT of 17.2° F. is because LWC at −22° F. is lower than at 17.2° F., resulting in a reduced rate of ice accumulation.

In the above examples, the cycle time of step 150 is calculated from the OAT and the TAS. However, this is not required. It is alternatively possible to use a properly positioned and calibrated ice rate sensor to vary the cycle time of step 150 in accordance with the ice accretion rate.

As stated above, although there are conditions under which the heater may advantageously be turned off slightly before or after the ice-bearing surface is flexed, it is nonetheless true that these two events must always occur close together in time. The objective is to flex the specified protected region at the proper time and sequence in order to remove ice accretions sufficiently so that if any inter-cycle or accumulated ice remains, it will be within acceptable limits.

II. Apparatus in Accordance with a Preferred Embodiment

Figure 2:
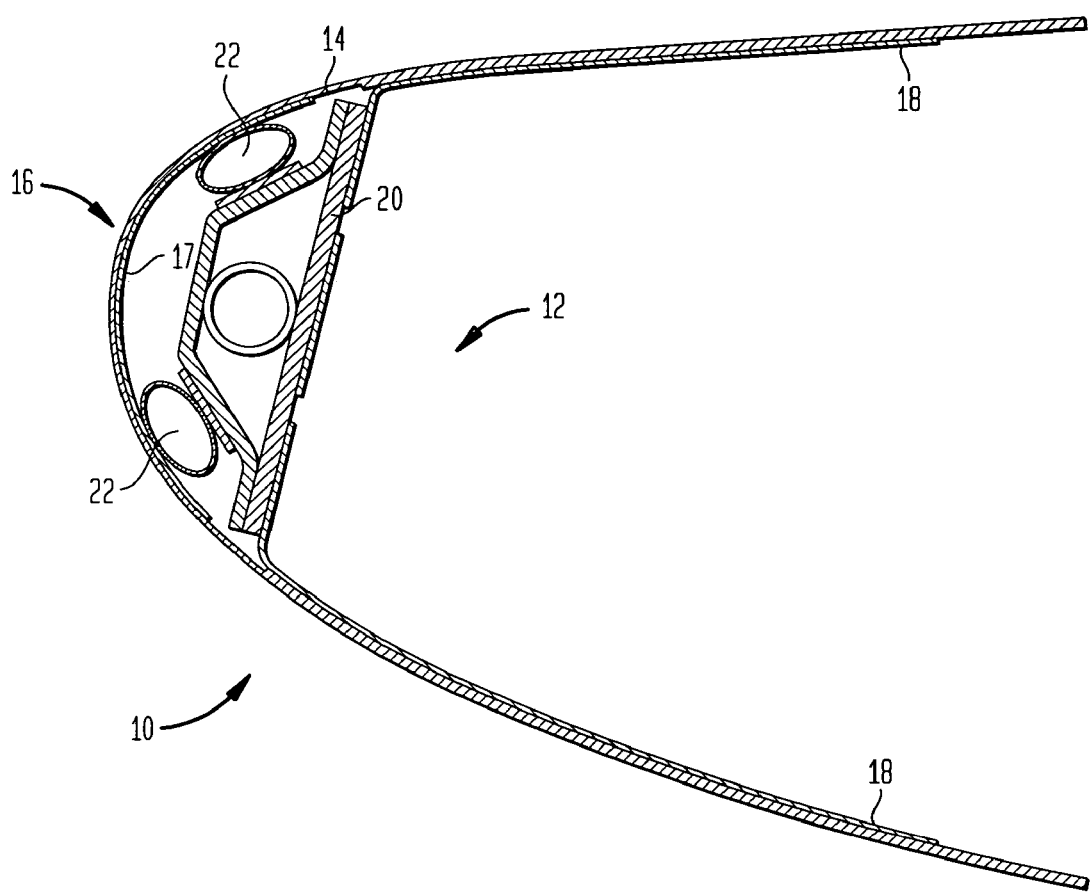
FIGS. 2 and 3 show apparatus in accordance with a preferred embodiment of the invention.
Figure 3:
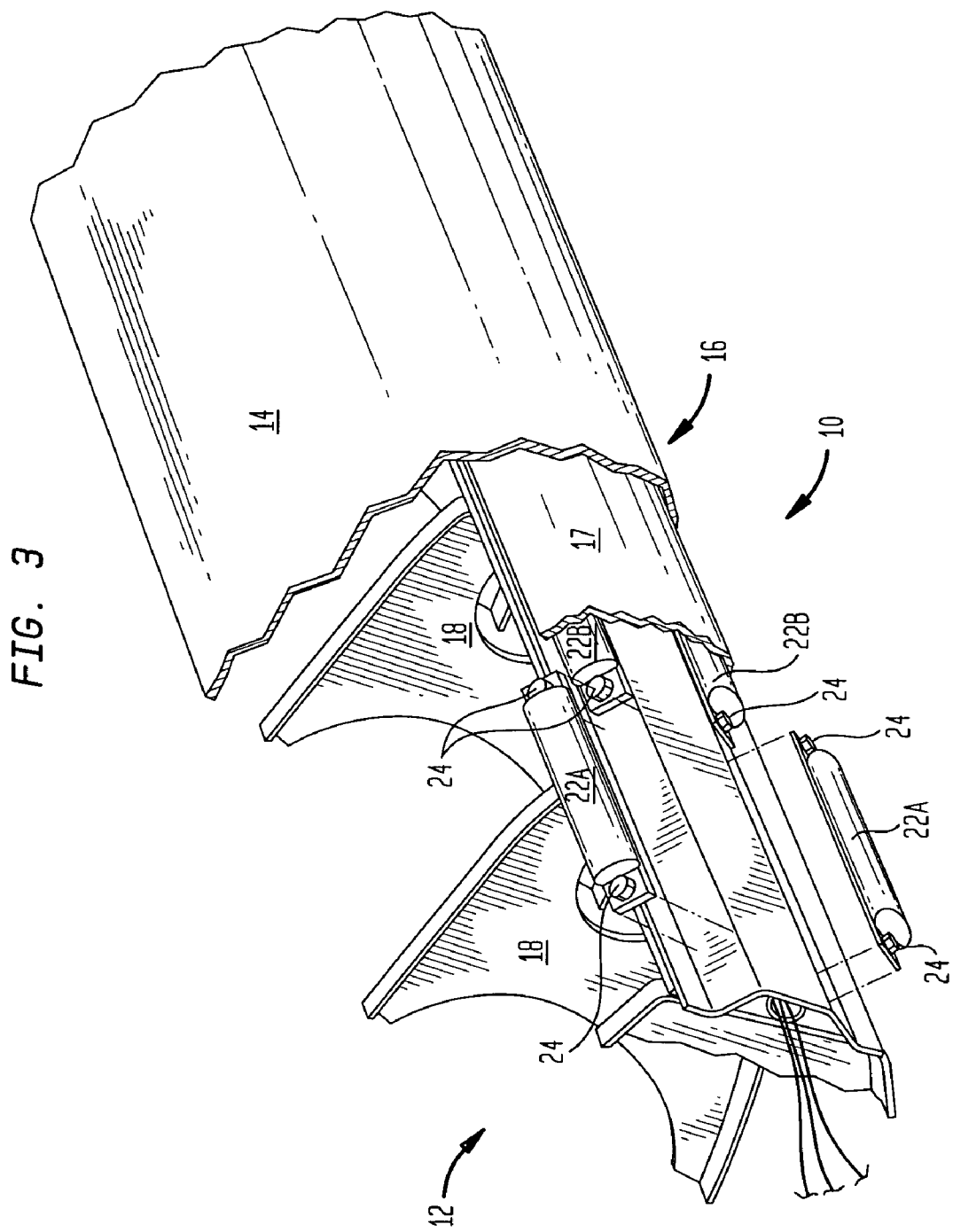

Referring now to FIGS. 2 and 3, an airfoil generally indicated by reference numeral 10 (in this example, the airfoil is an airplane wing) contains a rigid substructure generally indicated by reference numeral 12. The function of the substructure is to prevent the airfoil 10 from deforming in use.

As is disclosed in the '502 patent, the breeze surface of the airfoil 10 is made of a semi-rigid skin 14. The skin 14 is advantageously made of a relatively thin metal with a relatively high thermal diffusivity (high thermal conductivity and low thermal capacitance) for fast thermal response from the heater input, but it can alternatively be made of another metal or a fiber composite. The material and precise thickness of the skin 14 are not features of the invention; it is only important that the skin 14 be sufficiently rigid to return to its unflexed state even after many flexing cycles while being sufficiently flexible to be flexed by actuators driven by relatively low-power electrical pulses (see below).

Aft of the protected region 16 (which, see below, is within or near the impingement zone of the wing 10) the skin 14 may be thicker and is fixed to ribs 18 (which are part of the substructure 12). Thus, the skin 14 is unsupported at the protected region 16. A flexible and relatively thin electric heater 17 (advantageously but not necessarily made of heater wires, printed circuits or electrically conductive sheets embedded in a high thermal diffusivity carrier that is nonelectrically conductive, e.g., a glass fiber composite or polyimide film) is co-located directly on the inside surface of the skin 14 at the protected region 16.

Inside the wing, and aft of the protected region 16, is located a frame structure 20 (which, like the ribs 18, is part of the substructure 12). Pairs 22A, 22B etc. of actuators generally indicated by reference numeral 22 in FIG. 2 are secured to the frame structure 20 as by fasteners 24, but the method of attaching the actuators 22 to the frame structure 20 is not part of the invention. The actuators 22 bear against the heater 17. All the actuators 22 are identical; as will be discussed below, the actuators 22A are advantageously fired as a pair, as are the actuators 22B, and as are other pairs of actuators (not shown).

The actuators 22 are of the type disclosed in U.S. Pat. No. 5,782,435 and the above-referenced '502 patent. As is explained in those patents, each of the actuators 22 is in the shape of a flattened and elongated tube. When an actuator 22 is fired by a short, high voltage electrical pulse, magnetic fields inside the actuator 22 momentarily change its shape and the actuator 22 becomes more circular for a short period of time. The frame structure 20 is rigid, the skin 14 and attached heater 17 form a semi-rigid structure, and the actuators 22 bear against the heater 17. So, when the actuators 22 are pulsed, they momentarily stress the skin 14 (along with the heater 17 that is attached to it) and force the skin 14 outward, causing it to flex momentarily to shed accreted ice as discussed above. Once the electrical pulse has ceased, the internal magnetic fields inside the actuator 22 collapse, the actuator 22 returns to its flattened state, the stress on the skin 14 and attached heater 17 is removed, and the skin 14 (together with the attached heater 17) returns to its original position.

In the preferred embodiment, two actuators 22 are operated sequentially as a pair (generally, 3 hits per actuator per cycle, lasting about 0.3 second per hit). This is to insure that the flexure of the skin 14 is adequate to shed the accreted ice. However, this is not required, and it is alternatively possible to use one actuator 22 or more than two of them. The number of actuators 22 will be determined by the requirements of the application in which the invention is to be used.

III. Application to a Commercial Aircraft

For most efficient operation, apparatus in accordance with the invention must be appropriately positioned on the surface to be protected. Proper positioning will now be discussed with reference to FIG. 4, which illustrates a cross-sectional view of the leading edge region of an airfoil 10, which (as discussed above) in this example is an airplane wing.

In icing conditions, droplets of supercooled water (not specifically shown) impinge on the airfoil 10. Relative to the airfoil 10, the droplets follow trajectories 300. As can be seen from FIG. 4, the droplets do not impinge on the entire surface of the airfoil 10; they impinge only on the impingement zone 306 between the upper impingement limit 302 and the lower impingement limit 304.

It is evident that any ice protection system must protect at least a portion of the impingement zone 306, because ice will surely accrete there and the forward portion of the impingement region is usually the most contamination-sensitive region of the airfoil. However, as a practical matter an ice protection system cannot be limited to the impingement zone 306. This is because ice forming aft of the impingement zone 306 will—perhaps to an unacceptable extent—disturb the airflow required for efficient operation. For example, if the aircraft undergoes an icing encounter with supercooled large droplets, including freezing rain or drizzle, ice can contaminate the surface of the airfoil 10 far beyond the periphery of the impingement zone 306. Furthermore, as stated above, some ice protection systems generate runback water, which will generally refreeze aft of the impingement zone 306 to form ice ridges. These ice ridges can create a substantial discontinuity and can substantially change the shape of the breeze surface of the airfoil 10.

Figure 4:
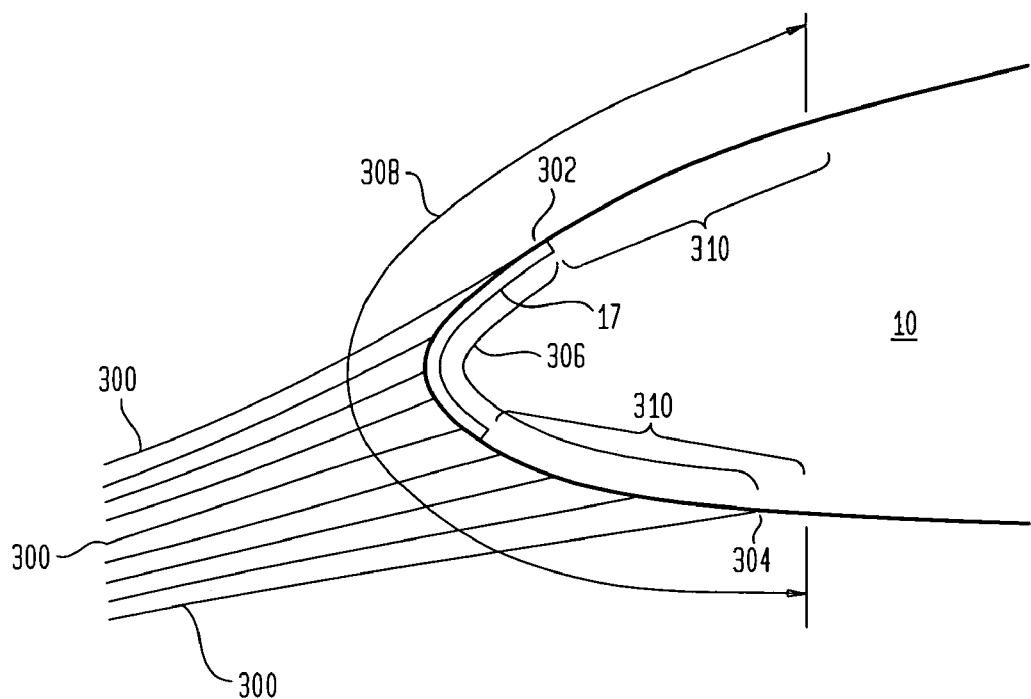

For these reasons, an ice protection system must in most cases prevent excessive ice accumulation throughout a larger region, shown in FIG. 4 as the roughness-sensitive region 308. Hence, in accordance with the preferred embodiment, the skin 14 must be attached to the airfoil aft of the roughness-sensitive region 308 so as to be able to flex within all parts of it.

In accordance with the preferred embodiment, the heater 17 is located only in the maximally contamination-sensitive region of the airfoil, i.e. in the region where accreted ice must be held within stringently thin limits. (This region is identified by the airframe manufacturer.) As stated above, in this maximally contamination-sensitive region, accreted ice (not shown) is removed by co-action between heat from the heater 17 and flexure of the skin 14; heat is used to reduce the force of adhesion between the ice and the skin 14, and flexure of the skin 14 then removes the ice. Region 310, which is located within the roughness-sensitive region 308 but is outside the periphery of the heater 17, is protected only by flexure of the skin 14. This is because region 310 is less sensitive to ice contamination than the region covered by the heater 17, and ice accumulation there need not be held to such stringently thin limits. The actuators used in the preferred embodiment are consistently able to remove ice layers that are 0.060 inch or more thick. In the illustrated example, the airfoil is assumed to have acceptable performance even when ice contamination in region 310 reaches a thickness of 0.060 inch. Thus, there is no need to provide heat to region 310 and a heater is unnecessary there.

In practice, the airframe manufacturer will define the overall roughness-sensitive region 308 and will identify the maximally contamination-sensitive region where the heater 17 is to be located. The less contamination-sensitive region 310 will then be defined by default. It is alternatively possible (although unlikely) for more than one maximally contamination sensitive region to exist, and if this is so a plurality of heaters 17 can be used and controlled separately or together as the application requires. In other words, in accordance with the preferred embodiment there is at least one maximally contamination-sensitive region; there may be more than one in particular circumstances. Likewise, in accordance with the preferred embodiment there will usually be a less contamination-sensitive region in which the maximum acceptable ice accumulation thickness is greater, but this is not absolutely necessary. There may exist an ultra-high performance airfoil wherein the entire roughness-sensitive region must be kept very clean under all icing conditions, and for such a demanding application the heater 17 would be precisely coextensive with the roughness-sensitive region 308.

FIGS. 5A-5C shows how a method in accordance with the preferred embodiment of the invention can be implemented on the wings of a conventional commercial jet. Each wing is provided with four spanwise slats, SL1 through SL4 on the left wing and SR1 through SR4 on the right wing, and each spanwise slat (e.g. SR1) is provided with nine protected zones Z1SR1, Z2SR1 . . . Z9SR1.

Apparatus in accordance with the preferred embodiment of the invention illustrated in FIGS. 2 and 3 is installed in each of the seventy two protected zones. (There are two wings, each with four slats, and each slat has nine zones.) Four energy storage bank units ("ESBs") 500, 502, 504, and 506 are provided. ESB 500 provides energy to the apparatus in slats SL1 and SL2, ESB 502 provides energy to the apparatus in slats SL3 and SL4, and ESBs 504 and 506 similarly provide energy to apparatus in slats SR1 and SR2 and slats SR3 and SR4, respectively. As is discussed below, each ESB includes the functionality necessary to turn heaters 17 on and off and to fire actuator pairs—e.g. actuators 22A and 22B—in succession. A deicing control unit ("DCU") 508 is connected to the avionics system 510 of the aircraft, which supplies information about the aircraft's TAS and OAT to the DCU so that it can appropriately control the operation of the ESBs 500-506.

In operation, when a deicing operation is initiated by the DCU 508, each ESB 500, 502, 504, 506 operates identically. In the instance of ESB 504 (see FIGS. 5B and 5C), the heater 17 in the first zone Z1SR1 of the first slat SR1 is turned on, the bond between the accreted ice and the first zone Z1SR1 is reduced, the heater 17 is turned off, and the actuators 22 in the first zone Z1SR1 are fired to remove the accreted ice. Then, the same operations are carried out in the second zone Z2SR1. This process then continues, zone by zone progressing from inboard to outboard, until the last (ninth) zone Z9SR1 has been cleared of ice.

Once all the zones Z1SR1-Z9SR1 have been cleared of ice, the ESB 504 then repeats this operation with the nine zones Z1SR2-Z9SR2 in the second slat SR2, clearing one zone after the next, progressing from inboard to outboard. Once this has been completed, the ESB 504 then repeats the same operation in the first slat SR1.

It will be understood that all the ESB's 500-506 operate in parallel, so that at any given time four of the eight slats SR1-SR4 and SL1-SL4 will be undergoing deicing. In this illustrated preferred embodiment, slats SR1, SR3, SL1, and SL3 are deiced together, and then slats SR2, SR4, SL2, and SL4 are deiced together. And, in each instance, one zone in each slat is deiced at a time, with the most inboard zone being deiced first and the most outboard zone being deiced last. The whole cycle is repeated as necessary, at such speed as is required to maintain the wings at or below the maximally-acceptable levels of ice accretion.

Persons skilled in the art will realize that the particular arrangement of slats and zones is not critical. Other arrangements of slats and zones, and other orders of operation (e.g. outboard to inboard as opposed to inboard to outboard, or a nondirectional order) can be used instead. Furthermore, in the preferred embodiment four ESB's 500-506 are used, each supplying energy to two slats (e.g. SR1 and SR2). This arrangement is preferred because it minimizes the weight of the system and keeps the distances between an ESB and the zones it deices to a minimum, thereby maximizing energy transfer to the actuators and minimizing energy loss in the wiring. However, this is not required. One ESB may be used for each slat, or for more than two slats, or even for all zones on a single wing, depending on the application and the particular components chosen for the ESB.

In this connection, one important additional consideration in determining the number of ESB's in the system is the desirability of avoiding wide fluctuations in the power drawn from the aircraft while still preventing ice accretion from exceeding the preestablished maximum acceptable thicknesses. In this example, only two ESB's (e.g. the inboard ESB's 500 and 504 or the outboard ESB's 502 and 506) operate simultaneously. As compared with using four ESB's, this doubles the duration of the cycle required to deice all seventy two zones, but reduces by half the power required to operate the system. Such an arrangement prevents unnecessarily wide swings in the power drawn by the system, i.e. avoids high power draw while deicing is ongoing followed by negligible power draw during a long idle period following a complete deicing cycle.

Additionally, while the slats SR1-SR4 and SL1-SL4 are shown to be approximately the same length, and the various zones (e.g. Z1SR1-Z9SR1) are shown as being approximately the same width, this is merely a schematic. The dimensions of the various components will be dictated by the particular application for which the system is used.

Figure 6:
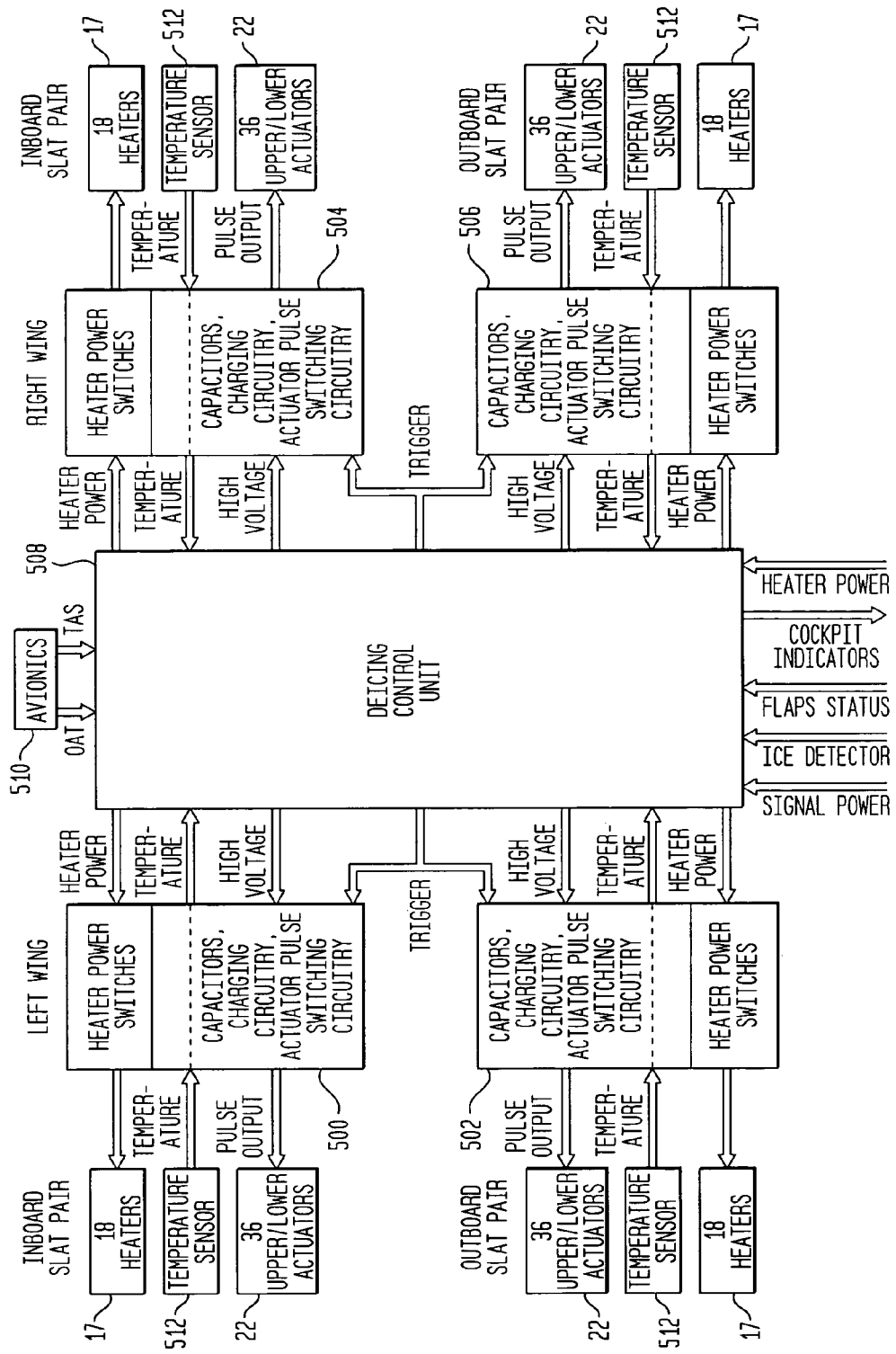
FIG. 6 is a schematic illustration of the system architecture of the electronic circuitry used in apparatus in accordance with a preferred embodiment of the invention.

FIG. 6 shows in more detail the system architecture of the electrical elements of apparatus in accordance with the preferred embodiment. Each ESB actually contains three main component subgroups. One subgroup is a bank of capacitors or other energy storage devices, together with circuitry that keeps the capacitors at an appropriate state of charge during operation. Another subgroup is made up of components that cause voltage pulses from the capacitors to be directed to the particular actuators or actuator pairs 22 to be fired. The third subgroup is made up of components that cause the heaters 17 to be turned on and off. In operation, the DCU 508 initiates deicing when an ice detector (not shown) sends a signal (ICE DETECTOR) to the DCU 508 that ice is beginning to accumulate. The DCU supplies power to the heaters 17 (HEATER POWER) through the ESB's, and high voltage (HIGH VOLTAGE) to charge the capacitors in the ESB's 500-506. Then, in accordance with OAT and TAS information (OAT and TAS) from the aircraft's avionics system 510, the DCU 508 sends out timed trigger signals (TRIGGER) that cause the heaters 17 and pairs of actuators 22 to be properly energized and de-energized.

In this preferred embodiment, the DCU 508 will accept input from the flaps (FLAPS STATUS). This is to provide the option of providing an extra-clean wing surface on final approach (when the flaps will be used). This is particularly true when conditions are such that a pause period exists following the completion of one deicing cycle and before the commencement of the next one. In such a case, the pause period may be eliminated and the deicing cycle shortened, thus decreasing the maximum accumulation of inter-cycle ice. The DCU provides status information (COCKPIT INDICATORS) to the pilot.

Optionally, and in accordance with the preferred embodiment, a temperature sensor 512 is provided for each of the ESB's 500-506. The temperature sensor 512 is mounted to the skin 14 or the heater 17 of the first zone deiced by each ESB (e.g. zone Z1SR1 in the case of ESB 504) and measures the temperature when the heater 17 is energized. This can be used to make sure that the skin 14 is brought up to the proper temperature when the heater 17 is energized, and to provide a means to adjust the duty cycles of the heaters 17 if this is not so. Four temperature sensors 512 provide redundancy. When the sensor is installed on the skin, it provides a direct status of the skin temperature. However, when it is installed on the heater, it provides an indirect status of the skin temperature, which is calculated based on the heater sensor temperature, sensor location, heater construction, material properties, and heater power density (besides TAS and OAT). Clearly, installation of the sensor on the skin is preferred, but is not necessarily the only practical alternative.

Quite obviously, the herein-disclosed system architecture is preferred but not required. It would alternatively be possible to provide more than one DCU 508, and the particular system inputs and outputs to the DCU 508 and the ESB's 500-506 could be different. The system architecture is not part of the invention.

Although at least one preferred embodiment of the invention has been described above, this description is not limiting and is only exemplary. The scope of the invention is defined only by the claims, which follow:

The invention claimed is:

1. An ice protection system for use on an airfoil having an aerodynamic surface made of a semi-rigid skin, the system protecting a predetermined region of the skin from excessive ice accretion, the system comprising:
   an electric heater for heating said region of the skin, said electric heater being flexible, being located subjacent said region of the skin, and being mechanically bonded thereto; and
   actuator means for momentarily flexing said region of the skin, said actuator means being located directly subjacent the electric heater and bearing against the electric heater, whereby actuation of said actuator means momentarily stresses the electric heater, thereby momentarily flexing it together with said region of the skin.

2. An ice protection system for use on an airfoil having an impingement zone where supercooled water droplets strike the airfoil during an icing encounter, the airfoil having an aerodynamic surface made of a semi-rigid skin, the system protecting the airfoil from excessive ice accretion at a maximally contamination-sensitive region within the impingement zone, the system comprising:
   an electric heater for heating said region of the skin to a temperature at least equal to 32° F., said electric heater being flexible, being located subjacent said region of the skin, and being mechanically bonded thereto; and
   electrical actuator means for momentarily flexing said region of the skin in response to an electrical pulse, said actuator means being located directly subjacent the electric heater and bearing against the electric heater, whereby actuation of said actuator means by an electrical pulse momentarily stresses the electric heater, thereby momentarily flexing it together with said region of the skin.

3. An ice-protected airfoil system having an aerodynamic surface with an impingement zone where supercooled water droplets strike the airfoil during an icing encounter, the airfoil being protected from excessive ice accretion at a maximally contamination-sensitive region within the impingement zone, comprising:
   a substructure;
   a semi-rigid skin attached to the substructure, a region of the skin constituting said maximally contamination-sensitive region;
   an electric heater for heating said region to a temperature at least equal to 32° F., the electric heater being flexible, being located subjacent said region of the skin, and being mechanically bonded thereto; and
   electrical actuator means for momentarily flexing said region of the skin in response to an electrical pulse, said actuator means being fixed to the substructure and being located directly subjacent the electric heater and bearing against the electric heater, whereby actuation of said actuator means by an electrical pulse momentarily stresses the electric heater, thereby momentarily flexing it together with said region of the skin.

4. The system of claims 1, 2, or 3, wherein the actuator is elongated and mechanically deformable and is in the shape of a flattened and elongated tube.

5. An ice protection system for use on an airfoil having an aerodynamic surface made of a semi-rigid skin and having a maximally contamination-sensitive region of said surface and a less contamination-sensitive region of said surface, said system comprising:
   an electric heater for heating the maximally contamination-sensitive region of the skin to a temperature at least equal to 32° F., the electric heater being flexible, being located subjacent said maximally contamination-sensitive region of the skin, and being mechanically bonded thereto; and
   electrical actuator means for momentarily flexing the skin in response to an electrical pulse, said actuator means being directly subjacent the electric heater and bearing against the electric heater, whereby actuation of said actuator means momentarily stresses the electric heater, thereby momentarily flexing it together with both of said regions of the skin.

6. An ice-protected airfoil system having an aerodynamic surface made of a semi-rigid skin and having a maximally contamination-sensitive region of said surface and a less contamination-sensitive region of said surface, comprising:
   a substructure;
   a semi-rigid skin attached to the substructure, a region of the skin constituting said maximally contamination-sensitive region;
   an electric heater for heating said maximally contamination-sensitive region of the skin to a temperature at least equal to 32° F., said electric heater being flexible, being located subjacent said maximally contamination-sensitive region of the skin, and being mechanically bonded thereto; and
   electrical actuator means for momentarily flexing the skin in response to an electrical pulse, said actuator means being fixed to the substructure and being located directly subjacent the electric heater and bearing against the electric heater, whereby actuation of said actuator means by an electrical pulse momentarily stresses the electric heater, thereby momentarily flexing it together with both of said regions of the skin.

* * * * *